Aug. 28, 1962 I. W. SANDBERG 3,051,920

ACTIVE TWO-PORT NETWORK

Filed March 3, 1961

INVENTOR
I. W. SANDBERG

BY Ralph P. Holcomb
ATTORNEY

United States Patent Office 3,051,920
Patented Aug. 28, 1962

3,051,920

ACTIVE TWO-PORT NETWORK

Irwin W. Sandberg, Springfield, N.J., assignor to Bell Telephone Laboratories, Incorporated, New York, N.Y., a corporation of New York

Filed Mar. 3, 1961, Ser. No. 93,175
6 Claims. (Cl. 333—80)

This invention relates to wave transmission networks and more particularly to an active, two-port network.

An object of the invention is to realize an important class of transmission characteristics without resorting to the use of inductors or transformers. Other objects are to reduce the number of resistors and minimize the number of capacitors required in a network for this purpose. A further object is to absorb the source and load resistances into the network.

In wave transmission networks intended for use at low frequencies, it is often desirable to eliminate inductors and transformers in order to reduce the cost and save space. For the same reasons, it is desirable to restrict the number of component resistors and capacitors. Also, it is advantageous to have a resistor at each end of the network so that the resistances associated with the source and the load may be absorbed, thus eliminating the need for isolation networks.

The active, two-port network in accordance with the present invention is well adapted to meet these requirements. The network comprises a series impedance $Z_1$ at its input end and a shunt impedance branch at its output end. The impedance $Z_1$ may include a series resistor but requires no inductors or transformers. The shunt branch includes a resistor of value $R_2$ shunted by the combination of an impedance $Z_a$ connected in series with a negative-impedance converter terminated by an impedance $Z_b$. The impedances $Z_1$ and $R_2$ are so choosen with respect to the open-circuit voltage transfer function T of the network that $Z_a$ and $Z_b$ comprise only resistors and capacitors. Furthermore, only a comparatively small number of resistors and a minimum number of capacitors are required. Also, the values of the end resistors may be modified to allow for the source and load resistances.

An important class of transmission characteristics may be realized with the network. In particular, the network can be designed to provide a transfer function of the biquadratic type, or a constant-resistance, all-pass structure.

The nature of the invention and its various objects, features, and advantages will appear more fully in the following detailed description of the typical embodiments illustrated in the accompanying drawing, of which:

Figure 1:
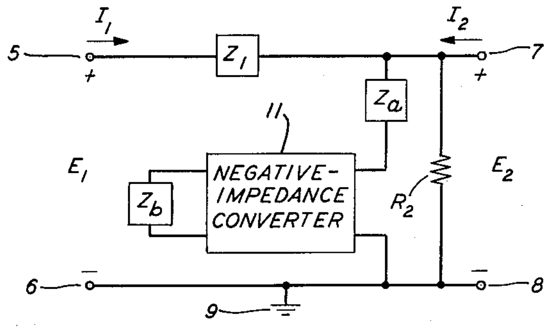
FIG. 1 is a schematic circuit of an active, two-port network in accordance with the invention.

As shown in FIG. 1, the network is an unbalanced, active, two-port structure, with a pair of input terminals 5—6 and a pair of output terminals 7—8. A signal source may be connected to the input terminals and a suitable load to the output terminals. The terminals 6 and 8 may be connected to a ground 9. The network has a series impedance branch $Z_1$ at its input end and a shunt impedance branch at its output end. The shunt branch comprises the resistance $R_2$ shunted by the series combination of the impedance $Z_a$ and a negative-impedance converter 11 which is terminated by the impedance $Z_b$. The reference directions of the input and output currents $I_1$ and $I_2$ are indicated by the arrows, and the reference polarities of the input and output voltages $E_1$ and $E_2$ are shown.

It will now be explained how the impedances $Z_1$, $Z_a$, and $Z_b$ may be chosen to provide a wide variety of useful transmission characteristics for the network without using inductors or transformers. Two specific examples will be presented in some detail.

The design of networks frequently involves the synthesis of the biquadratic transfer function $$T(s)=K_1\left[\frac{s^2+as+b}{s^2+cs+d}\right]$$

with complex conjugate left-half plane poles, and zeros which are complex-conjugate or on the positive-real axis. Here, $s$ is the complex frequency variable. For real frequencies, $s$ becomes $j\omega$, where $\omega$ is the radian frequency. The parameter $K_1$ is the gain constant and $a$, $b$, $c$, and $d$ are also constants. Depending upon the choice of $a$, $b$, $c$, and $d$, such functions yield transfer characteristics which include those of the low-pass, high-pass, band-pass, or all-pass type. In FIG. 1, $Z_1$, $Z_a$, and $Z_b$ are assumed to be passive, two-terminal impedances comprising only resistors and capacitors, usually called RC structures. The negative-impedance converter 11 may be of either the voltage-inversion or current-inversion type.

For this configuration, the open-circuit voltage transfer function $T(s)$, which is the ratio of $E_2$ to $E_1$ when $I_2$ is zero, is given by $$T(s)=\frac{Z_a-Z_b}{Z_1+(1+Z_1/R_2)(Z_a-Z_b)} \qquad (1)$$

The open-circuit input impedance $Z_{in}(s)$, which is the ratio of $E_1$ to $I_1$ when $I_2$ is zero, is $$Z_{in}(s)=Z_1+\frac{(Z_a-Z_b)R_2}{Z_a-Z_b+R_2} \qquad (2)$$

We first consider the realization of biquadratic transfer functions in which, typically, $Z_1$ comprises only a resistor of value $R_1$. From (1), if we substitute $R_1$ for $Z_1$ and let $G_1=1/R_1$ and $G_2=1/R_2$, we find $$Z_a-Z_b=\frac{R_1T(s)}{1-\left[\frac{G_1+G_2}{G_1}\right]T(s)} \qquad (3)$$

It is well known that the right-hand side of (3) can be expanded as the sum of positive and negative RC impedances if $$1-\left[\frac{G_1+G_2}{G_1}\right]T(s)$$

has distinct negative-real zeros. By considering root-locus arguments, it can be shown that this can always be done for the functions considered here.

The synthesis procedure includes the following two steps: ($a$) Determine the value of $(G_1+G_2)/G_1$. The permissible values of this parameter can be determined by inspection of the graph of $T(s)$ for real values of $s$ and constitute a restriction on the gain constant, $K_1$, that can be obtained with this structure. The choice of this parameter also influences the element values and the sensitivity of the transfer function to variations in the active and passive parameters. ($b$) Expand the right-hand side of (3) in partial fraction form to identify the impedances and obtain the element values.

As a first example, it is assumed that $T(s)$ is given by $$T(s)=K_1\left[\frac{s^2-3s+2}{s^2+s+1}\right] \qquad (4)$$

We assume also that the network is to work into a load resistance of one ohm. Hence, we may choose $R_2$ less than or equal to one ohm. For simplicity, we choose $R_2=1$.

From root-locus considerations, or by inspecting the graph of $T(s)$ for real values of $s$, we choose $$\left[\frac{G_1+G_2}{G_1}\right]K_1=\frac{1}{4} \quad (5)$$

or, since $R_2=1$, $$\left[\frac{G_1+1}{G_1}\right]K_1=\frac{1}{4} \quad (6)$$

For simplicity, we choose $G_1=2$, which from (6) yields $K_1=1/6$.

Substituting $R_1=1/2$, $R_2=1$, $K_1=1/6$, and Expression 4 into 3 gives $$Z_a-Z_b=\frac{s^2-3s+2}{9(s+1/3)(s+2)} \quad (7)$$

The right-hand side of Expression 7 in partial fraction form is $$\frac{1}{9}+\frac{28/135}{s+1/3}-\frac{36/45}{s+2} \quad (8)$$

Figure 2:
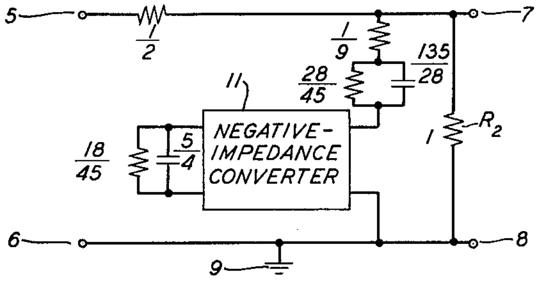
FIG. 2 is a schematic circuit of an embodiment providing a biquadratic transfer function in which the impedance $Z_1$ typically comprises only a resistor.

FIG. 2 shows the configuration of the resulting network. The values of the resistances in ohms and the capacitances in farads are given beside the elements. The resistance $R_2$ is furnished entirely by the load.

The network shown in FIG. 1 is also useful as a first-degree, constant-resistance, all-pass, delay network. Such networks can be used for correcting delay distortion, and have the important advantage that they can be connected in cascade without the necessity of employing isolation networks.

We therefore now consider the synthesis of the first-degree, all-pass, transfer function $$T(s)=K_2\left[\frac{s-a}{s+a}\right] \quad (9)$$

subject to the restriction that $Z_{in}$, as given by Equation 2, is purely resistive. We denote $Z_{in}$ by $R_{in}$.

From (1), (2), and (9) we obtain $$Z_1=R_{in}\left[\frac{s(1-K_2)+a(K_2+1)}{s+a}\right] \quad (10)$$

and $$Z_a-Z_b=\frac{R_{in}K_2(s-a)}{s(1-R_{in}K_2/R_2)+a(1+R_{in}K_2/R_2)} \quad (11)$$

It follows from (10) and (11) that $K_2$, the gain constant in (9), must be chosen to satisfy $$0<K_2\leq 1 \quad (12)$$

and $$K_2<\frac{R_2}{R_{in}} \quad (13)$$

As a second example, consider the synthesis of the transfer function $$T(s)=K_2\left[\frac{s-2}{s+2}\right] \quad (14)$$

It is assumed that $R_2$ constitutes the input impedance of a following stage, and is equal to unity. We wish to provide a network having an input impedance $R_{in}$ also equal to unity and a transfer function given by (14).

From (12) and (13), it is clear that we may choose $K_2=3/4$. From (10), with $R_{in}=1$, $K_2=3/4$, and $a=2$, we obtain $$Z_1=\frac{1}{4}+\frac{3}{s+2} \quad (15)$$

Similarly, we obtain from (11)

$$Z_a-Z_b=3-\frac{48}{s+14}$$

Figure 3:
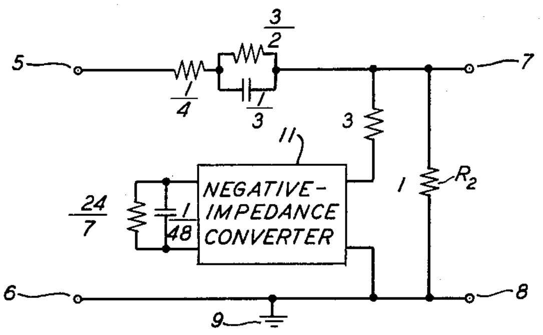
FIG. 3 is a second embodiment in which the network is a constant-resistance, all-pass structure.

The complete network, with element values in ohms and farads, is shown in FIG. 3. Here, also, the load provides all of the resistance $R_2$.

It is to be understood that the above-described arrangements are only illustrative of the application of the principles of the invention. Numerous other arrangements may be devised by those skilled in the art without departing from the spirit and scope of the invention.

What is claimed is:

1. An active, two-port network having an open-circuit voltage transfer function T and comprising a series impedance $Z_1$ at its input end and a shunt impedance branch at its output end, the shunt branch comprising a resistor of value $R_2$ shunted by the combination of an impedance $Z_a$ connected in series with a negative-impedance converter terminated by an impedance $Z_b$, in which $$T=\frac{Z_a-Z_b}{Z_1+(1+Z_1/R_2)(Z_a-Z_b)}$$

and $Z_1$ and $R_2$ are so chosen with respect to T that the impedances $Z_a$ and $Z_b$ comprise only resistors and capacitors.

2. A network in accordance with claim 1 in which the impedance $Z_1$ consists only of a resistor.

3. A network in accordance with claim 1 having an all-pass transmission characteristic and an input impedance which is purely resistive.

4. An active wave transmission network comprising a pair of input terminals, a pair of output terminals, three impedances $Z_1$, $Z_a$, and $Z_b$, a resistor of value $R_2$, and a negative-impedance converter, $Z_1$ being connected between an input terminal and the corresponding output terminal, the resistor being connected between the ouput terminals, $Z_a$ being connected in series with the converter to form an impedance branch which is also connected between the output terminals, $Z_b$ being the termination for the converter, the open-circuit transfer function T of the network being given by the expression $$T=\frac{Z_a-Z_b}{Z_1+(1+Z_1/R_2)(Z_a-Z_b)}$$

and $Z_1$ and $R_2$ being so chosen with respect to T that the impedances $Z_1$, $Z_a$, and $Z_b$ are realizable with resistors and capacitors only.

5. A network in accordance with claim 4 in which the impedance $Z_1$ consists only of a resistor and T is a function of the biquadratic type.

6. A network in accordance with claim 4 having an all-pass transmission characteristic and an input impedance which is purely resistive.

No references cited.